United States Patent [19]

Saito

[11] Patent Number: 4,918,306

[45] Date of Patent: Apr. 17, 1990

[54] APPARATUS FOR ADJUSTING A BEAM POSITION DETECTING DEVICE

[75] Inventor: Taizo Saito, Tokyo, Japan

[73] Assignee: Asahi Kogaku Kogyo Kabushiki Kaisha, Tokyo, Japan

[21] Appl. No.: 384,381

[22] Filed: Jul. 25, 1989

Related U.S. Application Data

[63] Continuation of Ser. No. 47,944, May 8, 1987, abandoned.

[30] Foreign Application Priority Data

May 8, 1986 [JP] Japan .............................. 61-69162[U]

[51] Int. Cl.[4] ............................................. G02B 26/10
[52] U.S. Cl. .................................... 250/235; 250/236; 350/6.8
[58] Field of Search .................. 250/235, 236; 350/6.5, 350/6.7, 6.8, 6.9, 6.91, 632, 633, 634, 636; 355/67, 68

[56] References Cited

U.S. PATENT DOCUMENTS

| | | | |
|---|---|---|---|
| 3,957,339 | 5/1976 | Engel | 350/6.5 |
| 3,981,566 | 9/1976 | Frank et al. | 350/6.5 |
| 4,264,120 | 4/1981 | Uchiyama et al. | 350/6.8 |
| 4,318,135 | 3/1982 | Allis et al. | 250/239 |
| 4,581,657 | 4/1986 | Takano | 250/239 |

Primary Examiner—Edward P. Westin
Attorney, Agent, or Firm—Sughrue, Mion, Zinn, Macpeak & Seas

[57] ABSTRACT

A beam position detector, particularly for use in a scanned laser beam printer, in which the scanned beam is reflected by a mirror to a light sensor. In order to align the mirror, a mirror holder is rotatable on a base plate also holding the sensor. The mirror is also tiltable with respect to the base plate.

6 Claims, 3 Drawing Sheets

APPARATUS FOR ADJUSTING A BEAM POSITION DETECTING DEVICE

This is a continuation of application Ser. No. 047,944 filed May 8, 1987, now abandoned.

BACKGROUND OF THE INVENTION

1. Field of the Invention

This invention relates to a beam position detecting device which is provided for a device such as a laser printer using a laser beam.

2. Background of the Invention

A beam position detecting device of this type has been disclosed by Japanese Patent Application (OPI) No. 5227/1984 (the term "OPI" as used herein means "an unexamined published application"). The arrangement of the device will be briefly described with reference to FIG. 1. A laser beam outputted by a laser (not shown) is reflected by a rotating polygonal mirror 11, and the laser beam thus reflected reaches the surface of a photosensitive drum (not shown) with its local scanning speed compensated by an f-θ lens 12. A mirror 14 for reflecting the laser beam towards a beam sensor 13 is disposed in the path of the laser beam to detect whether or not the laser beam is at a predetermined scanning position. The mirror 14 is mounted on a vertical plate 16 of a mirror holder 15. The angle of the mirror 14 with respect to a horizontal plane can be adjusted by turning a screw 18 which is engaged with a horizontal plate 17 which is extended horizontally from the vertical plate 16. The lower end of the screw 18 is abutted against a base plate 19. Therefore, as the screw 18 is turned, the vertical plate 16 is tilted, as a result of which the angle of the mirror 14 with respect to the base plate (horizontal plane) 19 is changed.

However, it is impossible to adjust the angle of the mirror 14 within the horizontal plane because the mirror holder 15 has been fixedly secured to the base plate 19 with two screws 21 and the lower end of the screw 18 is kept abutted against the base plate 19. Therefore, if the angle of the mirror 14 in the horizontal plane is to be changed, then an optical system (encircled with the broken line in FIG. 2 for instance) including the rotating polygonal mirror 11, the f-θ lens 12, the mirror 14 and the beam sensor 13 must be displaced, in its entirety, in the scanning direction to detect the correct scanning position of the laser beam.

SUMMARY OF THE INVENTION

Accordingly, an object of this invention is to provide a beam position detecting device which, even when the angle of the mirror in the horizontal plane is changed, can detect the correct scanning position of the laser beam without moving the optical system.

In the beam position detecting device according to the invention, a mirror holder is mounted on the base plate in such a manner that the member can be turned along the base plate, and an adjusting member is provided between the mirror holder and the mirror in such a manner that the adjusting member is engaged with the mirror to adjust the angle of the mirror with respect to the base plate.

BRIEF DESCRIPTION OF THE DRAWINGS

FIG. 2 is a plan view outlining an optical system in the device of the invention, FIG. 3 is a perspective view showing the optical system which has the mirror holding member of FIG. 4 and the fixing member of FIG. 5.

FIG. 4 is a perspective view of a mirror holding member adapted to support a mirror in the device of the invention, and FIG. 5 is a plan view showing a fixing member for supporting a beam sensor in the device of the invention.

DETAILED DESCRIPTION OF THE PREFERRED EMBODIMENTS

One preferred embodiment of this invention will be described with reference to FIGS. 2 through 5.

Figure 1:
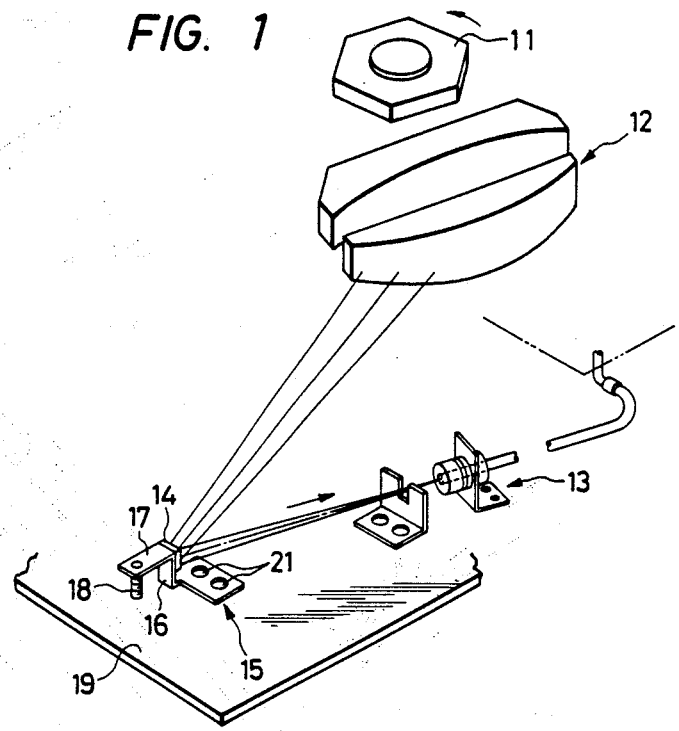
FIG. 1 is a perspective view showing a mirror holding member and a beam sensor in a conventional beam position detecting device.
Figure 2:
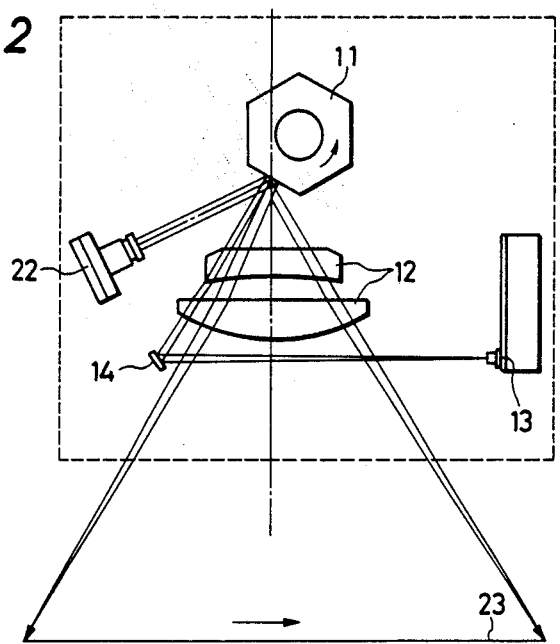
FIGS. 2 through 5 show one example of a beam position detecting device according to this invention. More specifically.
Figure 3:
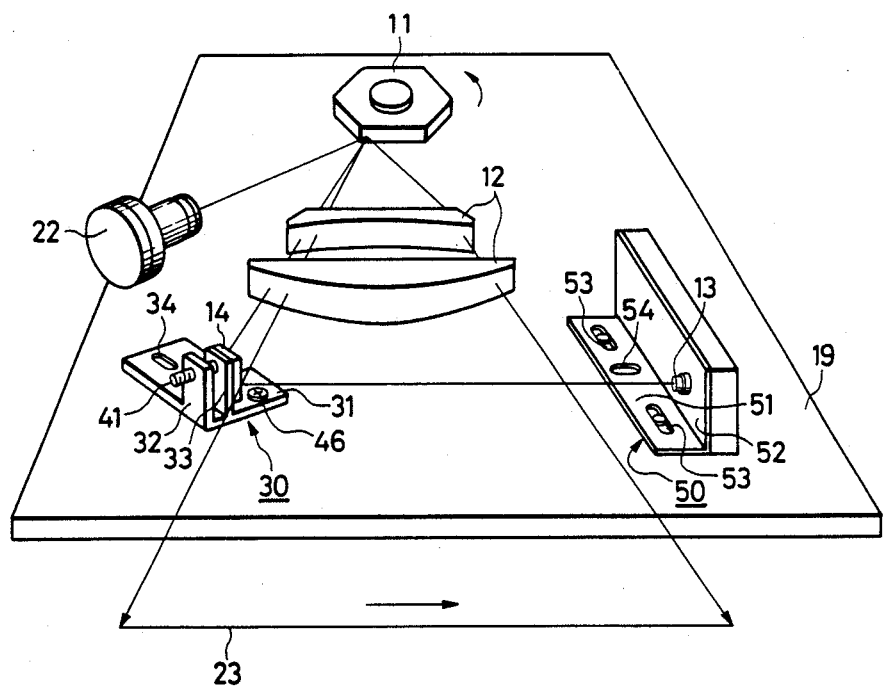

FIGS. 2 and 3 outline the arrangement of an optical system in a beam position detecting device of the invention. In FIGS. 2 and 3, a laser 22 outputs a laser beam which is modulated with an input signal which a computer or the like provides according to image data. The laser beam thus outputted is reflected by a rotating polygonal mirror 11 having a plurality of mirror faces. The reflected laser beam is focused on a focal-plane 23 by an f-θ lens 12. As is well known in the art, the f-θ lens 12 functions optically to move the laser beam on the focal plane 23 at uniform speed proportional to the speed of rotation of the electric motor driving the polygonal mirror 11. The photosensitive surface of a photosensitive drum or the like is arranged in the focus plane 23, so that optical data are given to the photosensitive surface by the laser beam which scans the focus plane 23 as described above.

A mirror 14 is disposed on the optical path of the laser beam at a position located immediately before the scanning start point in the focal plane 23. The mirror 14 reflects the laser beam passed through the f-θ lens 12 to a beam sensor 13. The beam sensor 13 operates to detect when the laser beam is at a predetermined scanning position, and apply a detection signal to a printer control circuit (not shown). In response to the detection signal, the control circuit determines the time when applying predetermined optical data to the photosensitive drum is to be started. That is, the timing of the laser beam is detected by the beam sensor 13, so that the errors in the divisional accuracy of the mirrors of the polygon mirror 11 can be absorbed so that the variation in period of the horizontal signal, which is caused by the non-uniform rotation of the motor, is greatly decreased. As a result, an image of excellent quality is formed on the photosensitive drum.

The above-described arrangement is well known in the art. The specific feature of the invention resides in means for finely adjusting the positions of the mirror 14 and the beam sensor 13.

Figure 4:
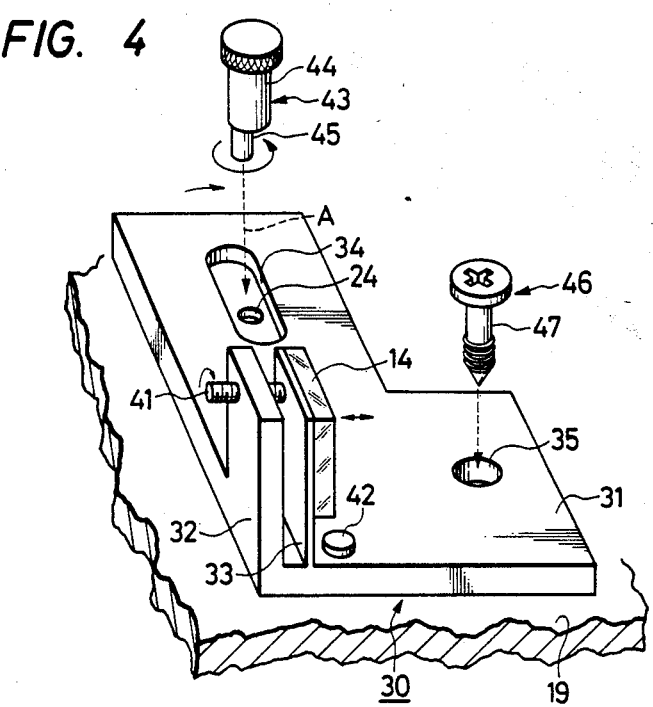

FIG. 4 shows a mirror holder 30 in detail which is used to install the mirror 14 on a base plate 19. The mirror holder 30 includes an L-shaped flat horizontal plate 31 and a stationary vertical plate 32 formed on the L-shaped flat horizontal plate at its corner in such a manner that the vertical plate 32 is perpendicular to the horizontal plate 31. This integral structure also includes a flexible vertical mounting plate 33 formed on the L-shaped flat plate 31 in such a manner that the flexible plate 33 is substantially parallel with the stationary vertical plate 32. The thickness of the flexible mounting plate 33 is significantly less than that of the stationary vertical plate 32. The mirror 14 is secured to one side of the flexible mounting plate 33 which is opposite to the other side of the flexible mounting plate 33 which faces the stationary vertical plate 32. A set screw 41 is screwed into the stationary vertical plate 32 until its front end abuts against the other side of the flexible mounting plate 33 (hereinafter referred to as "the rear side of the flexible mounting plate 33"). Therefore, as the set screw is turned, the front end of the set screw is moved in the axial direction, so that the angle of inclination of the flexible mounting plate 33 with respect to the flat horizontal plate 31 changes as the flexible vertical plate 33 is flexed. That is, the angle of inclination of the mirror 14 with respect to a horizontal plane is changed.

The flat horizontal plate 31 is rotatably mounted on the base plate 19 by means of a pin 42 provided in the corner of the flat horizontal plate 31. That is, the flat horizontal plate 31 can rotate in a horizontal plane, if necessary. To turn the flat horizontal plate 31 about the pin 42, an elongated hole 34 is formed in the flat horizontal plate 31 and the flat horizontal plate 31 is so positioned that the elongated hole 34 is aligned with a circular hole 24 formed in the base plate 19. As shown in FIG. 4, an eccentric cam 43 comprises a cylindrical body 44 and a supporting pin 45 extended from the bottom of the cylinder 44 in such a manner that the supporting pin 45 is off-center from the eccentric cam 43. The eccentric cam 43 is combined with the flat plate 31 and the base plate 19 in such a manner that the supporting pin 45 is inserted into the round hole 24 as indicated by the arrow A while the cylindrical body 44 is engaged with both sides of the elongated hole 34. When, under this condition, the eccentric cam 43 is turned, the side wall of the elongated hole 34 is pushed by the cylindrical body 43 because the cylindrical body 43 is off-center with respect to the supporting pin 45. As a result, the flat horizontal plate 31 is turned about the pin 42. A fixing screw 46 is used to fix the flat plate 31 in place on the base plate 19. A through hole 35 through the flat horizontal plate 31 has a diameter larger than that of a shank 47 of the fixing screw 46 so that the flat horizontal plate 31 can swing about the pin 42 within a predetermined range of angles.

Figure 5:
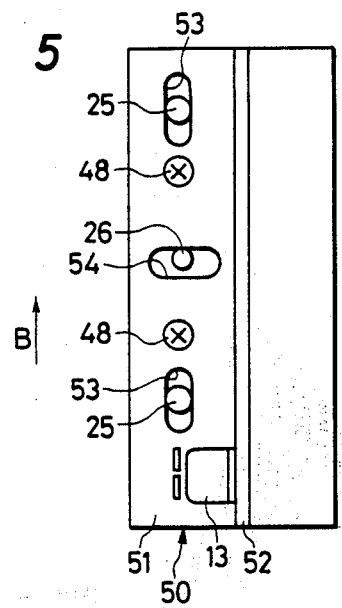

FIG. 5 shows a sensor holder 50 in detail which is used to install the beam sensor 13 on the base plate 19. The sensor holding member 50 is L-shaped in section, comprising as horizontal plate 51 fixedly secured to the base plate 19 and a vertical plate 52 perpendicular to the horizontal plate 51. The beam sensor 13 is secured to the side of the vertical plate 52 in such a manner as to confront the mirror 14 of FIG. 4. As the polygonal mirror 11 rotates, the laser beam reflected by the mirror 14 scans an area near the beam sensor 13 in the direction of the arrow B in FIG. 5. The beam sensor 13 thus installed can be moved in the scanning direction.

A pair of elongated guide holes 53 parallel with the scanning direction and an elongated adjustment hole 54 perpendicular to the elongated guide holes 53 are cut in the horizontal plate 51 to allow the beam sensor 13 to move in the scanning direction. The elongated guide holes 53 of the horizontal plate 51 are engaged with guide pins 25 embedded in the base plate 19, while the elongated adjustment hole 54 is aligned with a round hole 26 formed in the base plate 19. The cylindrical walls of the guide pins 25 are in contact with the side walls of the elongated guide holes 53 so that the sensor holding member 50 is guided in the scanning direction.

On the other hand, the cylindrical body 44 and the supporting pin 45 of an eccentric driver 43, which is similar to the eccentric driver 43 shown in FIG. 4, are inserted into the elongated adjustment hole 54 and the round hole 26, respectively. When the eccentric driver 43 is turned similarly as in the case of the mirror holding member 30 shown in FIG. 4, the side wall of the elongated adjustment hole 54 is pushed by the cylindrical body 44 of the eccentric driver 43, so that the sensor holder 50 is moved in the scanning direction. Similarly as in the case of the mirror holder 30, fixing screws 48 are used to fix the sensor holder 50 in place on the base plate 19, and holes (not shown) whose diameter is larger than that of the shanks of the fixing screws 48 are cut in the horizontal plate 51.

In the above-described embodiment, the sensor holding member 50, which supports the beam sensor 13, is made movable in the scanning direction of the laser beam, as was described above. This can correct the error in detection position in the scanning direction of the laser beam which is caused when the angle of the mirror 14 in a horizontal plane (i.e., a plane including the surface of the base plate 19) is adjusted.

In the case where the range of adjustment of the angle of the mirror 14 in a horizontal plane is relatively small, the sensor holder 50 supporting the beam sensor 13 may be fixedly secured to the base plate 19 so that it may not be able to move relative to the base plate 19. On the other hand, when the sensor holder 50 has a relatively large range of position adjustment, the mirror 14 may be fixed. That is, the adjustment of the angle of the mirror 14 in the horizontal plane may be eliminated.

As was described above, in the beam position detecting device of the invention, the adjusting member such as a set screw for adjusting the angle of inclination of the mirror is free from the base plate. That is, it is provided between the mirror and the mirror holder, and the mirror holder is made rotatable with respect to the base plate. Therefore, even if the angle of the laser beam reflected from the mirror changes with respect to a plane parallel with the base plate, it can be readily adjusted without moving the whole optical system, so that the scanning position of the laser beam can be detected accurately.

What is claimed is:

1. A beam position detecting device for detecting a scanned light beam which moves in a first direction through a scanning range, comprising:
 a mirror disposed to intercept an optical path of said scanned light beam;
 a light beam sensor for detecting a light beam reflected from said mirror;
 a base plate supporting said mirror and said light beam sensor;
 a mirror holding member rotatably supported about an axis perpendicular to said base plate, for holding said mirror;
 an adjusting member provided between said mirror holding member and said mirror for adjusting an angle of said mirror with respect to said base plate; and
 means for mounting said light beam sensor on said base plate to be displaceable along a direction transverse to a direction between said mirror and said light beam sensor,
 wherein said mirror and said light beam sensor are disposed in a plane parallel to said first direction, said mirror being disposed immediately outside a start point of said scanning range and said light beam sensor being disposed outside an end point of said scanning range.

2. A device as recited in claim 1, further comprising;
optical scanning means for causing said scanned light beam to be scanned along a path partially including said mirror.

3. A device as recited in claim 1, wherein said means for mounting said light sensor comprises:
a support plate movable on said base plate; and
an eccentric cam including an upper cylindrical portion and a lower cylindrical pin portion extending from the bottom of said upper portion, the axes of said upper and lower portions being parallel to one another and displaced from one another so that said lower pin portion is disposed off-center on the bottom of said upper portion;
said support plate having an elongated slot parallel to said direction between said mirror and said light sensor, said slot being aligned with a circular adjustment hole in said base plate, said lower portion of said eccentric cam extending into said circular adjustment hole in said base plate and the sides of said upper portion engaging with the sides of said elongated slot so that when said eccentric cam is rotated said means for mounting said light sensor moves in said direction transverse to said direction between said mirror and said light sensor.

4. A beam position detecting device for detecting a scanned light beam which moves in a first direction through a scanning range, comprising:
a mirror disposed to intercept an optical path of said scanned light beam;
a light beam sensor for detecting a light beam reflected from said mirror;
a base plate for supporting said mirror and said light beam sensor;
a mirror holding member rotatably supported about an axis perpendicular to said base plate, for holding said mirror;
an adjusting member provided between said mirror holding member and said mirror for adjusting an angle of said mirror with respect to said base plate;
wherein said mirror holding member is part of an integral assembly comprising a support plate rotationally movable on said base plate about said axis perpendicular to said base plate, a first perpendicular plate having a first perpendicular thickness and rising at a right angle from said support plate, a second perpendicular plate having a second thickness, substantially less than said first thickness, and generally parallel to said first perpendicular plate and holding said mirror on a side thereof facing said sensor;

wherein said adjustment member comprises a rod, threadably engaged with said first perpendicular plate and having an end contactable with said second perpendicular plate, whereby said second perpendicular plate is angularly displaceable with respect to the first perpendicular plate; and
means for mounting said light beam sensor on said base plate to be displaceable along a direction transverse to a direction between said mirror and said light beam sensor, said mirror and said light beam sensor being disposed in a plane parallel to said first direction, said mirror being disposed immediately before a start point of said scanning range and said light beam sensor being disposed at a point immediately outside an end point of said scanning range.

5. A device as recited in claim 4, wherein said mirror holding member further comprises:
an eccentric cam including an upper cylindrical portion and a lower cylindrical pin portion extending from the bottom of said upper portion, the axes of said upper and lower portions being parallel to one another and displaced from one another so that said lower pin portion is disposed off-center on the bottom of said upper portion;
said support plate has an elongated slot disposed therein, said slot being aligned with a circular hole in said base plate, said lower portion of said eccentric cam extending into said circular hole in said base plate and the sides of said upper portion engaging with the sides of said elongated slot so that when said eccentric cam is rotated said mirror holding member rotates about said axis perpendicular to said base plate.

6. A device as recited in claim 4, wherein said means for mounting said light sensor comprises:
a support plate movable on said base plate; and
an eccentric cam including an upper cylindrical portion and a lower cylindrical pin portion extending from the bottom of said upper portion, the axes of said upper and lower portions being parallel to one another and horizontally displaced from one another so that said lower pin portion is disposed off-center on the bottom of said upper portion;
said support plate having an elongated slot parallel to said direction between said mirror and said light sensor, said slot being aligned with a circular adjustment hole in said base plate, said lower portion of said eccentric cam extending into said circular adjustment hole in said base plate and the sides of said upper portion engaging with the sides of said elongated slot so that when said eccentric cam is rotated said means for mounting said light sensor moves in said direction transverse to said direction between said mirror and said light sensor.

* * * * *